US006449632B1

(12) United States Patent
David et al.

(10) Patent No.: US 6,449,632 B1
(45) Date of Patent: Sep. 10, 2002

(54) APPARATUS AND METHOD FOR AGENT-BASED FEEDBACK COLLECTION IN A DATA BROADCASTING NETWORK

(75) Inventors: Esther David, Yad-Rambam; Shlomo Kipnis, Jerusalem; Sarit Kraus, Givat-Shemuel; David Richardson, Cesarea, all of (IL)

(73) Assignee: Bar Ilan University NDS Limited, Ramat Gan (IL)

( * ) Notice: Subject to any disclaimer, the term of this patent is extended or adjusted under 35 U.S.C. 154(b) by 0 days.

(21) Appl. No.: 09/285,214

(22) Filed: Apr. 1, 1999

(51) Int. Cl.$^7$ .............................................. G06F 15/16

(52) U.S. Cl. ....................... 709/202; 709/226; 709/229; 709/317; 705/10

(58) Field of Search ................................ 709/202, 317, 709/207, 217, 219, 225, 226, 228, 229, 231; 705/10

(56) References Cited

U.S. PATENT DOCUMENTS 4,602,279 A * 7/1986 Freeman ...................... 348/10
5,036,389 A 7/1991 Morales ....................... 358/84
5,282,249 A 1/1994 Cohen et al. ................. 380/23

(List continued on next page.)

FOREIGN PATENT DOCUMENTS

WO 9717774 5/1997
WO 9828869 7/1998
WO 9837696 8/1998
WO 99/01984 1/1999 .......... H04N/7/173

OTHER PUBLICATIONS

Korbsa, A. "User Modeling: Recent Work, Prospects And Hazards." Proceeds Of ACM Ch 1994, Conference On Human Factors In Computing–Systems, vol. 2 Of Tutorials, 13 pgs.

NDS"Functional Design Overview For Content Providers & Application Developers." Nov. 3, 1998, Owner: Shlomo Kipnis.

G. Pallouras et al. "Learning User Communities For Improving The Services of Informaiton Providers," Proceedings Of The 2$^{nd}$ European Conference On Research And Advanced Technology For Digital Libraries, Sep. 1998, pp. 367–384.

C. J. Rijsbergen, "Information Retrieval," Second Edition, Butterworth & Co. Publishers, 1979, Chapter Three—"Automatic Classification" pp. 29–55.

E. D. Goldberg, "Genetic Algorithms In Search Optimization & Machine Learning," Addison–Wesley Publishers, 1989, pp. 62–65.

G. Salton et al., "Introduction To Modem Information Retrieval," McGraw–Hill Publishers, 1983, pp. 59–63, 98–103, 136–149, 151–152, 157–171, 201–209, 220–221.

(List continued on next page.)

*Primary Examiner*—Saleh Najjar
(74) *Attorney, Agent, or Firm*—Ladas & Parry

(57) ABSTRACT

A system for collecting user feedback in a data broadcasting system, the system for collecting user feedback including a multiplicity of user profile agents, each user profile agent being associated with one of a multiplicity of users of the data broadcasting system and being operative to create a user profile based on activity of the one user, a user profile subsystem associated with a plurality of user profile agents chosen from among the multiplicity of user profile agents and operative to derive an integrated user profile based on the plurality of user profiles created by the plurality of user profile agents, and a broadcasting agent operatively associated with a broadcast center of the data broadcasting system and in operative communication with the user profile subsystem and receiving therefrom the integrated user profile.

24 Claims, 5 Drawing Sheets

U.S. PATENT DOCUMENTS

| | | | | | |
|---|---|---|---|---|---|
| 5,481,609 | A | | 1/1996 | Cohen et al. | 380/16 |
| 5,534,911 | A | * | 7/1996 | Levitan | 348/1 |
| 5,717,923 | A | * | 2/1998 | Dedrick | 707/102 |
| 5,726,701 | A | | 3/1998 | Needham | 348/2 |
| 5,758,257 | A | | 5/1998 | Herz et al. | 455/2 |
| 5,867,799 | A | * | 2/1999 | Lang et al. | 707/1 |
| 5,918,014 | A | * | 6/1999 | Robinson | 706/12 |
| 5,991,735 | A | * | 11/1999 | Gerace | 705/10 |
| 6,044,403 | A | * | 3/2000 | Gerszberg et al. | 709/225 |
| 6,049,777 | A | * | 4/2000 | Sheena et al. | 705/10 |
| 6,088,722 | A | * | 7/2000 | Herz et al. | 709/217 |
| 6,108,645 | A | * | 8/2000 | Eichstaedt et al. | 707/1 |
| 6,112,186 | A | * | 8/2000 | Bergh et al. | 705/10 |
| 6,119,098 | A | * | 9/2000 | Guyot et al. | 705/14 |
| 6,134,532 | A | * | 10/2000 | Lazarus et al. | 705/14 |
| 6,289,337 | B1 | * | 9/2001 | Davies et al. | 707/3 |
| 6,308,175 | B1 | * | 10/2001 | Lang et al. | 707/10 |

OTHER PUBLICATIONS

E. Rasmussen, "Information Retrieval—Data Structures And Algorithms," Prentice Hall Publishers, 1992, Chapter 16—"Clustering Algorithms" pp. 419–442.

G. Paliouras et al., "Learning User Communities For Improving The Services Of Information Providers," Proceedings Of The 2nd European Conference On Research And Advanced Technology For Digital Libraries, Sep. 1998, pp. 367–383.

D. Walley, "Free Commercial Mass–Audience Datacasting Of Popular Information And Software Direct To Personal Computers," Apr. 10, 1996, Materials Collected From The World Wide Web, Jun. 29, 1999, Http://www. mbnet.mb.ca/%7ewalleydc/int_intr.html, two pages.

D. Walley, "Data Broadcasting Vs. Conventional On–Line Services," Apr. 10, 1996, Materials Collected From The World Wide Web, May 17, 1999, http://www.mbnet.mb.ca/%7ewalleydc/advanta.html, two pages.

W. Wahlster, "Toward Personalized Multimedia," Materials Collected From The World Wide Web, May 23, 1999, http://www.um.org/um94invitedtalkabstr.html, one page.

"Video On Line—Powered By Melita Cable," Materials Collected From The World Wide Web, Jun. 29, 1999, http://www.vol.net.mt/, one page.

J. Vassileva, "A Practical Architecture For User Modeling In A Hypermedia–Based Information System ," Proceedings Of The 4th International Conference On User Modeling, Aug. 14–19, 1994, pp. 115–120.

"Universal Browser For Listings," Materials Collected From The World Wide Web, May 27, 1999, http://www.austinre.com/cgi/browser.cgi, one page.

"Report By The Study Group On Broadcasting System In The Multimedia Age," Materials Collected From The World Wide Web, May 27, 1999, http://www.mpt.go.jp/report/broadcasting–system/press–release.html, six pages.

A. Kobsa, "User Modeling: Recent Work, Prospects And Hazards," Proceedings Of ACM Ch 1994, Conference On Human Factors In Computing Systems, vol. 2 Of Tutorials, pp. 415–416.

"Infinite Ink's Robots And Mail Filtering," Materials Collected From The World Wide Web, May 27, 1999, http://www.ii.com/internet/robots/, two pages.

T. Imielinski et al., "Adaptive Wireless Information Systems," Proceedings Of Gigdbs Conference 1994, pp. 1–36.

S. Gant, "Webfilter: An Agent For Filtering The Web," 1995, Materials Collected From The World Wide Web, May 27, 1999, http://www.ils.unc.edu/webfilter/, one page.

K. C. Gowda, "Agglomerative Clustering Using The Concept Of Mutual Nearest Neighborhood," Pattern Recognition, vol. 10, No. 2, 1978, pp. 398–405.

"What's New—New FACCTS Reports," Materials Collected From The World Wide Web, May 27, 1999, http://www.faulkner.com/menu.html, three pages.

P. Resnick et al., "Grouplens: An Open Architecture For Collaborative Filtering Netnews," Proceedings Of ACM CSCW 1994, Conference On Computer Supporter Cooperative Work, pp. 175–187.

B. Krulwich, "Lifestyle Finder—Intelligent User Profiling Using Large–Scale Demographic Data," American Association For Artificial Intelligence, Copyright 1997, pp. 37–45.

J. Vidal et al., "Task Planning Agents In The UMDL," Proceedings Of The Intelligent Information Agents Workshop, Feb. 17, 1996, pp. 1–13.

U. Shardanand et al., "Social Information Filtering: Algorithms For Automating "Word Of Mouth"," ACM CHI '95 Mosaic Of Creativity, May 7–11, 1995, pp. 210–217.

D. White et al., "Algorithms And Strategies For Similarity Retrieval," Visual Computing Library, University Of California San Diego, 1996, pp. 1–43.

C. Faloutsos, "A Survey Of Information Retrieval And Filtering Methods," University Of Maryland CS–TR–3514, Aug. 1995, pp. 1–23.

P. Edwards et al. "Experience With Learning Agents Which Manage Internet–Based Information," AAAI Spring 1996 Symposium On Machine Learning In IA, Nine Pages.

L. Terveen et al., "Phoaks: A System For Sharing Recommendations," Communications Of The ACM, vol. 40, No. 3, Mar. 1997, pp. 59–62.

B. Sheth, "A Learning Approach To Personalized Information Filtering," Massacusettes Institute Of Technology, Feb. 1994, pp. 1–75.

Y. Ejgenberg et al. "Clustering Methods In Information Retrieval," Bar Ilan University, 1996–7, Chapters 1, 3, 4 And Appendix A.

D. Cutting et al., "Optimizations For Dynamic Inverted Index Maintenance," Proceedings Of Sigir 1990, pp. 1–7.

S. Cohen et al., "Shape–Based Illustration Indexing And Retrieval—Some First Steps," ARPA Image Understanding Workshop 1996, Four Pages.

E. Brown et al., "Fast Incremental Indexing For Full–Text Information Retrieval," Proceedings Of The 20th VLDB Conference 1994, pp. 1–10.

E. Bloedorn et al., "Representational Issues In Machine Learning Of User Profiles," Spring 1996 AAAI Symposium On Machine Learning In Information Access, Nine Pages.

W. Birmingham et al., "The Distributed Agent Architecture Of The University Of Michigan Digital Library (Extended Abstract)," Spring 1995 Symposium On Software Agents, Six Pages.

S. Acharya et al., "Broadcast Disks: Data Management For Asymmetric Communication Environments," Proceedings Of The ACM Sigmod Conference, May 1995, pp. 12 pages.

S. Acharya et al., "Disseminating Updates On Broadcast Disks," Proceedings Of The 22nd VLDB Conference, 1996, pp. 1–11.

K. Lang, "Newsweeder: Learning To Filter Netnews," Proceedings Of The 1995 INT Conference Of Machine Learning, pp. 331–339.

W. Ma et al., "Image Indexing Using A Texture Dictionary," Proceedings Of The 1995 SPIE Conference On Image Storage And Archiving System, vol. 2606, pp. 1–11.

P. Maes et al., "Learning Interface Agents," Proceedings Of The 1993 AAAI, pp. 459–465.

B. Manjunath et al., "Texture Features For Browsing And Retrieval Of Image Data, " IEEE T–PAMI Special Issue On Digital Libraries, Nov. 1996, pp. 1–17.

A. Moukas, "Amalthaea: Information Discovery And Filtering Using A Multiagent Evolving Ecosystem," The First International Conference On The Practical Application Of Intelligent Agents And Multi–Agents Technology, 1996, pp. 421–436.

S. J. Pelletier et al., "Stealth: A Personal Digital Assistant For Information Filtering," The First International Conference On The Practical Application Of Intelligent Agents And Multi–Agents Technology, 1996, pp. 455–473.

"CNN Custom News," Materials Collected From The World Wide Web, Jun. 29, 1999, One Page.

* cited by examiner

APPARATUS AND METHOD FOR AGENT-BASED FEEDBACK COLLECTION IN A DATA BROADCASTING NETWORK

FIELD OF THE INVENTION

The present invention relates to broadcast systems in general, and in particular to systems for collecting user feedback in a broadcast system, especially in a data broadcast system where feedback may be used for determining the content of future broadcasts.

BACKGROUND OF THE INVENTION

Data broadcasting systems have been proposed as a good solution for delivering data to customers while avoiding known problems associated with the Internet. In a typical data broadcasting system a single broadcast entity broadcasts information to a multiplicity of users, each user typically associated with a personal computer, a mobile computer, an interactive television, a hand-held communication device such as a beeper or a cellular or mobile telephone, or a similar device. Each user may receive those broadcast items which the user wishes to receive. Typically but not always, each broadcast item comprises a multimedia item.

It is generally recognized that it would be desirable to obtain user feedback at the broadcast entity, the user feedback typically comprising information about types of information which each user would like to receive. However, because of the multiplicity of users it would apparently be inefficient and awkward to receive individual feedback from each user.

One system for scheduling broadcasts using customer profiles is described in U.S. Pat. No. 5,758,257 to Herz et al. The Herz et al patent describes scheduling the receipt of desired movies or other forms of data by means of individual customer profiles describing each individual customer. A so-called "agreement matrix" is calculated by comparing the recipient's profiles to the actual profiles of the available programs or other data. A virtual channel for each individual is generated from the "agreement matrix", in an attempt to satisfy the desires of each individual via their own virtual channel.

PCT patent application PCT/IL98/00307 describes an electronic program guide system using an intelligent agent in which the electronic program guide may be customized based on user behavior.

The following references provide a sample of the state of the art, and are useful in understanding the present invention:

1. S. Acharya, M. Franklin and S. Zdonik. 1996. Disseminating updates on broadcast disks. *Proceedings of the 22nd VLDB Conference,* Mumbai (Bombay), India.
2. S. Acharya, R. Alonso, M. J. Franklin, and S. B. Zdonik. 1995. Broadcast disks: Data management for asymmetric communications environments. In M. J. Carey and D. A. Schneider, editors, *Proceedings of the* 1995 *ACM SIGMOD International Conference on Management of Data,* pages 199–210, San Jose, Calif., 1995. SIGMOD Record 24(2).
3. W. P. Birmingham, E. H. Durfee, T. Mullen, and M. P. Wellman. 1995. The distributed agent architecture of the University of Michigan Digital Library (UMDL). In *Spring Symposium Series on Software Agent.*
4. E. Bloedorn, I. Mani and T. R. MacMillan. 1996. Representational issues in machine learning of user profiles. *AAAI Spring Symposium on Machine Learning in Information Access.*
5. E. W. Brown, J. P. Callan, B. Croft. 1994. Fast incremental indexing for full-text information retrieval. Proceedings of *VLDB Conf,* pages 192–202.
6. cc:Browser. 1997. http://www.faulkner.com/
7. S. D. Cohen and L. J. Guibas. 1996. Shape-based illustration indexing and retrieval some first steps Stanford University, Stanford, *ARPA Image Understanding Workshop* 1996.
8. CNN++ News filtering Agent.
9. D. Cutting and J. Pederson. 1990. Optimizations for dynamic inverted index maintenance. Proceedings of *SIGIR,* pages 405–411.
10. Y. Ejgenberg and Y. Lindel. 1997. B.S.c project, Computer Science Department at Bar Ilan University.
11. P. Edwards, D. Bayer, C. L. Green and T. R. Payne. 1996. Experience with learning agents which manage Internet-based information. *AAAI Spring Symposium on Machine learning in IA,* Scotland.
12. C. Faloutsos and D. W. Oard. 1995. A survey of information retrieval and filtering methods. University of Maryland CS-TR-3514.
13. W. B. Frakes and R. Baeza-Yates. 1992. *Information Retrieval: Data Structures & Algorithms.* Prentice Hall Englewood Cliffs, N.J.
14. K. C. Gowda and G. Krishna. 1978. Agglomerative clustering using the concept of mutual nearest neighbourhood. *Pattern Recognition,* Vol. 10, No 2, pp. 105–112
15. S. Gant. WEbFilter: An agent for filtering the Web. http://ils.unc.edu/webfilter/.
16. D. E. Goldberg. 1989. *Genetic Algorithm in Search, Optimization and Machine Learning.* Addison-Wesley.
17. T. Imielinski, S. Viswanathan. 1994. Adaptive wireless information systems. In Proceedings of GIGDBS Conference, Tokyo, Japan.
18. 1. I. Ink and N. McGough. 1992. Robots and mail filtering http://www.ii.com/internet/robots/.
19. A. Kobsa. 1994. User modeling and user-adapted interaction. In *Proceedings of ACM CHI'*94 *Conference on Human Factors in Computing Systems,* Volume 2 of TUTORIALS, pages 415–416.
20. K. Lang. 1995. News Weeder: Learning to filter netnews. *Proceedings of INT Conference of Machine Learning,* PP 331–339.
21. W. Y. Ma and B. S. Manjunath. 1995. Image indexing using a texture dictionary. *Proceedings of SPIE Conference on Image Storage and Archiving System,* Vol. 2606, pp. 288–298. Philadelphia Pa.
22. P. Maes and R. Kozierok. 1993. Learning interface agents. *Proceedings of AAAI*-93 *Washington D.C. pp.* 459–465.
23. B. S. Manjunath and W. Y. Ma. 1996. Texture features for browsing and retrieval of image data. *IEEE T-PAMI special issue on Digital Libraries.*
24. A. Moukas. 1996. Amalthaea: Information discovery and filtering using a multi-agent evolving ecosystem. *The first international conference on the Practical Application of Intelligent Agents and Multi Agents Technology.* pp. 421–436.
25. S. J. Pelletier and J. F. Arcand. 1996. STEALTH: A personal digital assistant for information filtering. *The*

*first international conference on the Practical Application of Intelligent Agents and Multi Agents Technology.* pp. 455–474.

26. E. Rasmussen. 1992. *Information Retrieval. Data Structures and Algorithms.* Editors: W. B. Frakes and R. Baeza-Yates Prentice Hall Inc., Englewood Cliffs, N.J.
27. P. Resnick, N. Iacovou, M. Suchak, P. Bergstrom and J. Riedl. 1994. GroupLens: An open architecture for collaborative filtering of netnews. *Proceeding of ACM CSCW* 94 *Conference on Computer Supporter Cooperative Work.* pp. 175–186.
28. C. J. Van Rijsbergen. 1979. *Information Retrieval-Second Edition.* Butterworth & Co (Publisher) LTD.
29. G. Salton. and M. J. McGill. 1983. *Introduction to Modern Information Retrieval,* McGraw-Hill.
30. U. Shardanand and P. Maes. 1995. Social information filtering: Algorithms for automating "Word of Mouth". *ACM CHI'*95 *MOSAIC OF CREATIVITY,* pages 210–217.
31. B. D. Sheth. 1994. A Learning Approach to Personalized Information Filtering. Master's thesis, MIT Media Lab.
32. Study Group on Broadcasting System in the Multimedia Age (SGBSMA). 1995. Report by the Study Group on Broadcasting System in the Multimedia Age. Ministry of Posts and Telecommunication (MPT) of Japan, Press Release. Http://www.mpt.go.jp/Report/Broadcasting-system/press-release.html.
33. L. Terveen, W. Hill, B. Amento, D. MacDonald, and J. Creter. 1997. PHOAKS: A system for Sharing recommendations. Communication of the ACM, vol.40, no. 3, pages 59–62.
34. Universal Browser for Listening. 1997. http://www.austinre.com/cgi/browser.cgi.
35. J. Vassileva. 1994. A practical architecture for user modeling in a hypermedia-based information system. In *Proceedings of the* 4*th International Conference on user Modeling,* pages 115–120. MITRE Corporation.
36. J. M. Vidal and E. Durfee. 1995. Task planing agent in the UMDL. In *Proceedings of the* 1995 *Intelligent Information Agents Workshop.*
37. Video On Line. 1995. http://www.vol.it/VOLB/browser.html.
38. W. Wahlster. 1994. Toward personalized multimedia. In 3*Proceedings of the* 4*th International Conference on User Modeling,* pages 3–4. MITRE Corporation.
39. D. Walley. 1996a. Data broadcasting vs. conventional on-line services. Http://www.mbnet.mb.ca/~walleydc/advanta.html.
40. D. Walley. 1996b. Free commercial mass-audience datacasting of popular information and software direct to personal computers.
41. Http://ww.mbnet.mb.ca/~walleydc/int_intr.html.
42. A. White and R. Jain. 1996. Algorithm and strategies for similarity retrieval. University of California, San Diego.
43. Bruce Krulwich, 1997; Lifestyle Finder, Intelligent user profiling using large scale demographic data.
44. G. Paliouras, C. Papatheodorou, V. Karkaletsis, C. Spyropoulos, and V. Malaveta; "Learning user communities for improving the services of information providers".

The disclosures of all references mentioned above and throughout the present specification are hereby incorporated herein by reference.

SUMMARY OF THE INVENTION

The present invention seeks to provide an improved system for providing feedback in a broadcast system, particularly in a data broadcast system. In the present invention a user profile subsystem, preferably comprising a hierarchy of cooperating agents, is used to collect and aggregate user feedback for delivery to a broadcaster. Preferably, the broadcaster uses the user feedback for determining the content of future broadcasts.

There is thus provided in accordance with a preferred embodiment of the present invention a system for collecting user feedback in a data broadcasting system, the system for collecting user feedback including a multiplicity of user profile agents, each user profile agent being associated with one of a multiplicity of users of the data broadcasting system and being operative to create a user profile based on activity of the one user, a user profile subsystem associated with a plurality of user profile agents chosen from among the multiplicity of user profile agents and operative to derive an integrated user profile based on the plurality of user profiles created by the plurality of user profile agents, and a broadcasting agent operatively associated with a broadcast center of the data broadcasting system and in operative communication with the user profile subsystem and receiving therefrom the integrated user profile.

Further in accordance with a preferred embodiment of the present invention the user profile subsystem includes a plurality of clustering agents, each clustering agent being operatively associated with a subset of user profile agents chosen from among the plurality of user profile agents and being operative to derive a preliminary community profile based on the plurality of user profiles created by the subset of user profile agents.

Still further in accordance with a preferred embodiment of the present invention the system also includes at least one union set agent in operative communication with at least two of the plurality of clustering agents and operative to coordinate the operation of the at least two clustering agents.

Additionally in accordance with a preferred embodiment of the present invention the union set agent is operative to coordinate the operation of the at least two clustering agents by coordinating at least one characteristic of the preliminary community profile derived by the clustering agents.

Moreover in accordance with a preferred embodiment of the present invention the system also includes a community profile agent operative to derive a community profile from the preliminary community profile.

Further in accordance with a preferred embodiment of the present invention the integrated user profile includes at least one community profile.

There is also provided in accordance with another preferred embodiment of the present invention a method for collecting user feedback in a data broadcasting system, the method including providing a multiplicity of user profile agents, each user profile agent being associated with one of a multiplicity of users of the data broadcasting system, creating, using a plurality of user profile agents from among the multiplicity of user profile agents, a plurality of user profiles based on activity of a plurality of users, deriving, using a user profile subsystem associated with a plurality of user profile agents chosen from among the multiplicity of user profile agents, an integrated user profile based on the plurality of user profiles created by the plurality of user profile agents, and utilizing a broadcasting agent operatively associated with a broadcast center of the data broadcasting system and in operative communication with the user profile subsystem and receiving therefrom the integrated user profile.

Further in accordance with a preferred embodiment of the present invention the user profile subsystem includes a plurality of clustering agents, each clustering agent being operatively associated with a subset of user profile agents chosen from among the plurality of user profile agents, and the deriving step includes deriving the integrated user profile based on the plurality of user profiles created by the subset of user profile agents.

Still further in accordance with a preferred embodiment of the present invention the deriving step also includes coordinating the operation of at least two of the plurality of clustering agents using at least one union set agent in operative communication with at least two of the plurality of clustering agents.

Additionally in accordance with a preferred embodiment of the present invention the method also includes the union set agent coordinating the operation of the at least two clustering agents by coordinating at least one characteristic of a preliminary community profile derived by the clustering agents.

Moreover in accordance with a preferred embodiment of the present invention the integrated user profile includes at least one community profile.

Further in accordance with a preferred embodiment of the present invention the deriving step includes a community profile agent deriving the at least one community profile from a preliminary community profile.

Still further in accordance with a preferred embodiment of the present invention the utilizing step includes modifying at least one broadcast program based, at least in part, on the integrated user profile.

Additionally in accordance with a preferred embodiment of the present invention the modifying includes assigning, to a program associated with a first community, items scheduled to be broadcast according to a program associated with a second community.

Moreover in accordance with a preferred embodiment of the present invention the assigning includes assigning based on a measure of relevancy to the first community.

There is also provided in accordance with another preferred embodiment of the present invention a method for collecting user feedback in a data broadcasting system, the method including deriving a user profile for each of a multiplicity of data item users, clustering user profile information from at least some of the multiplicity of data item users to produce preliminary community information, modifying the preliminary community information to produce community information, and utilizing the community information for modifying a broadcast schedule.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
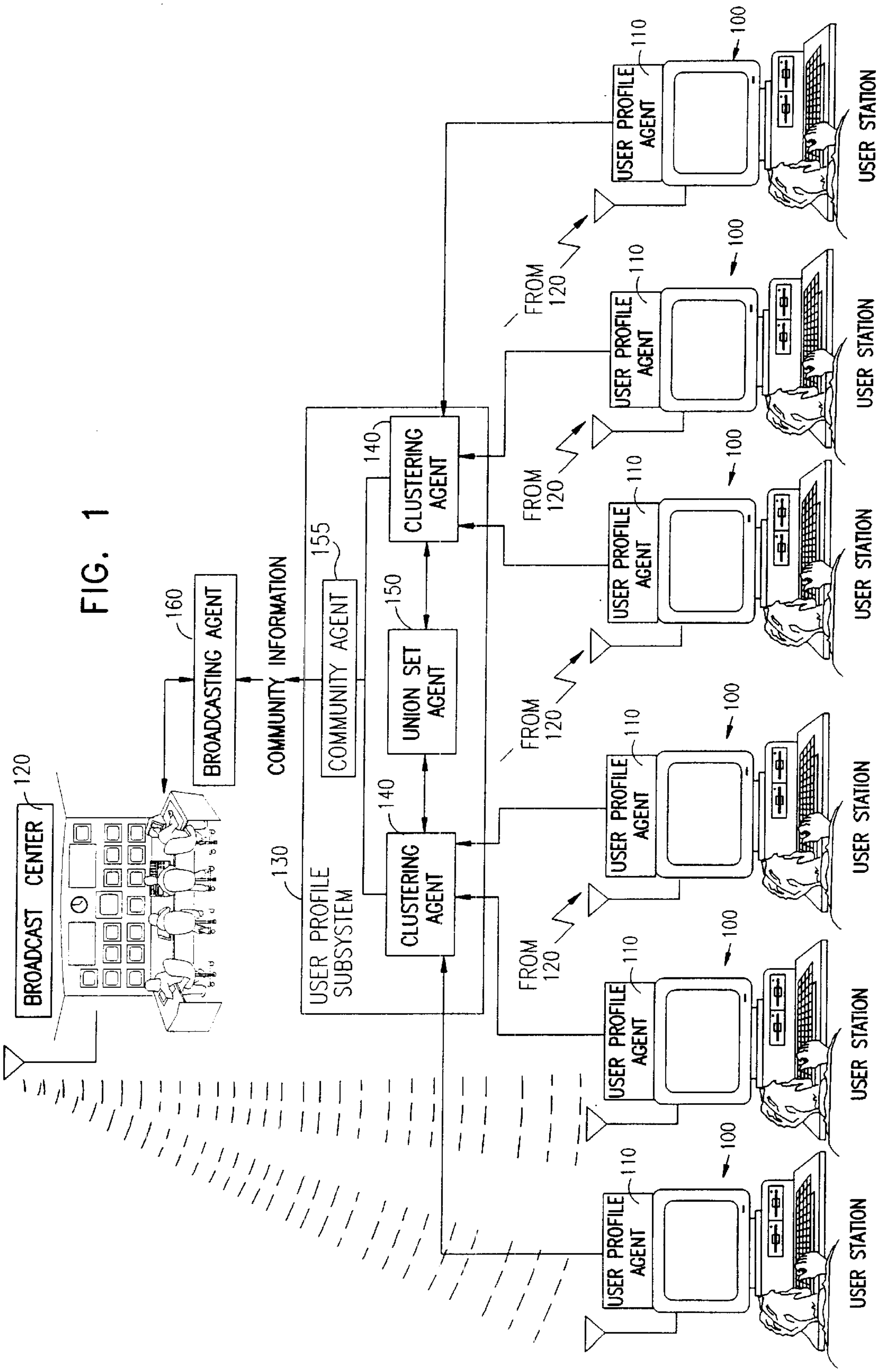
FIG. 1 is a simplified pictorial illustration of an agent-based user feedback collection system constructed and operative in accordance with a preferred embodiment of the present invention.

Reference is now made to FIG. 1 which is a simplified pictorial illustration of an agent-based user feedback collection system constructed and operative in accordance with a preferred embodiment of the present invention. The system of FIG. 1 comprises a plurality of user stations 100, each of the plurality of user stations 100 being operatively associated with a user profile agent 110. It is appreciated that, typically, a multiplicity of user stations 100, such as, for example, 1 million or more user stations 100, is provided, a plurality of user stations 100 being shown in FIG. 1 for sake of simplicity of description. It is also appreciated, as also described below, that other agents (not shown) in addition to the user profile agent 110, may also be operatively associated with each of the plurality of user stations 100.

Each of the user stations 100 preferably comprises an appropriate computing system, such as a multimedia computing system as is well-known in the art, equipped and operative to receive broadcasts, typically comprising multimedia data broadcasts, from a broadcast center 120. It is appreciated, as is well known in the art, that the broadcast center 120 may broadcast using any one or more of a variety of appropriate broadcast methods, including conventional terrestrial broadcast, digital terrestrial broadcast, satellite broadcast, cable broadcast, or any other appropriate broadcast method. It is further appreciated that each user station 100 is preferably equipped to receive broadcasts of a type broadcast by the broadcast center 120.

Each of the user profile agents 110 is preferably implemented in a combination of computing hardware and software, as is well known in the art, and is preferably operative to observe the behavior of a user of the associated user station 100 and to create a user profile, as described more fully below, characterizing the preferences of the user of the associated user station 100.

The system of FIG. 1 also comprises a user profile subsystem 130. The user profile subsystem 130 is preferably implemented in an appropriate combination of computing hardware and software, as is well known in the art, and is typically located remotely from each of the user stations 100, and in operative communication therewith. The user profile subsystem 130 is operative to receive a user profile from each of the user profile agents 110, to analyze the received profiles, and to derive therefrom a plurality of community profiles characterizing the multiplicity of user stations 100 in accordance with a plurality of communities, each community preferably sharing a set of preferences and characteristics. Typically, the user profile subsystem 130 produces an output comprising community information, preferably in the form of a plurality of community profiles each characterizing one community.

The user profile subsystem 130 typically comprises a plurality of agents, as described below. The plurality of agents comprised within the user profile subsystem 130 may, when referred to generally, be referred to as "integrated user profile agents". For simplicity of description, the integrated user profile agents are collectively referred to herein as the "user profile subsystem 130", it being appreciated that, because of possible separate implementation and possible geographic dispersal of the integrated user profile agents, the term "user profile subsystem 130" is itself a term which has been adopted mainly for the sake of simplicity of description.

The user profile subsystem 130 typically comprises a plurality of clustering agents 140, each clustering agent 140 being operatively associated with a subset of the user stations 100 and preferably being operative to produce one or more preliminary community profiles based on information received from the associated user profile agents 110 associated with each of the user stations 100 in the subset of the user stations 100.

The user profile subsystem 130 also typically comprises at least one union set agent 150. The union set agent 150 is preferably operative to cooperate with a plurality of clustering agents 140 and to adjust the operation thereof in such a way that community information produced by each clustering agent 140 is compatible with, and tends to form the same communities as, that produced by each other clustering agent 140. Specifically, and without limiting the generality of the foregoing, the union set agent 150 is preferably operative to examine community profiles produced by a plurality of clustering agents 140, to identify similar community profiles produced by different clustering agents 140, to unify the similar community profiles, and to report the unified profiles back to each of the different clustering agents 140 so that the different clustering agents 140 will operate with the same community profiles.

The system of FIG. 1 also comprises at least one community agent 155, typically comprising a plurality of community agents 155. Each community agent 155 is preferably associated with one community profile produced by one or more clustering agents 140 as described above, and is preferably operative to aggregate information relating to the one community profile as reported by the one or more clustering agents 140.

The system of FIG. 1 also comprises a broadcasting agent 160, which is typically implemented in an appropriate combination of computer hardware and software. The broadcasting agent 160 preferably receives the community information produced by the user profile subsystem 130 and is preferably operative, based on the received community information, to modify the operation of the broadcast center 120 to take into account community preference information comprised in the community information. By way of example only and without limiting the generality of the foregoing, modifying the operation of the broadcast center 120 may include modifying the content of future broadcasts.

The operation of the apparatus of FIG. 1 is now briefly described. The broadcast center 120 broadcasts a plurality of broadcast items to the multiplicity of user units 100. The user of each user unit 100 elects to receive one or more broadcast items; it is appreciated that, in some cases, a user may elect not to receive any items. It is appreciated, as is well known in the art, that a user may elect to receive a broadcast item using any appropriate technique, such as, for example: the user may select an individual item or a group of items in advance; the user may select an individual item or a group of items on demand; the user may program the user unit 100 to select a particular item, an item matching certain criteria, or an item broadcast at a particular time; or any appropriate combination of the above, including a combination with other techniques well known in the art. It is also appreciated that a filter agent (not shown) may automatically download, accept, or record only those items which are deemed to be of interest to the user based on criteria determined by the filter agent, by other agents, or otherwise, particularly as described below.

Each user profile agent 110 is preferably operative, as described more fully below, to create a user profile describing the item-selection preferences of the user of the associated user unit 100. Each user profile agent 110 then passes on the user profile to the user profile subsystem 130, specifically to one of the clustering agents 140. Each clustering agent 140 is preferably operative, as described more fully below, to cluster information from a plurality of user profiles and to create therefrom community profile information, representing a clustered aggregate of information about preferences of a plurality of users.

Preferably, the union set agent 150 is operative, as described more fully below, to coordinate the activities of the clustering agents 140 in order to assure that uniform community profile information, representing clustered information across all of the user units 100, is produced. Community information from a plurality of clustering agents 140 is then typically aggregated into a community profile for each community by one or more community agents 155, each community agent 155 preferably being associated with one community profile. The community information, typically in the form of the community profiles, is then passed on the broadcasting agent 160, where it is used as input in broadcast decisions of the broadcast center 120, including decisions as to the content of future broadcasts.

Figure 2:
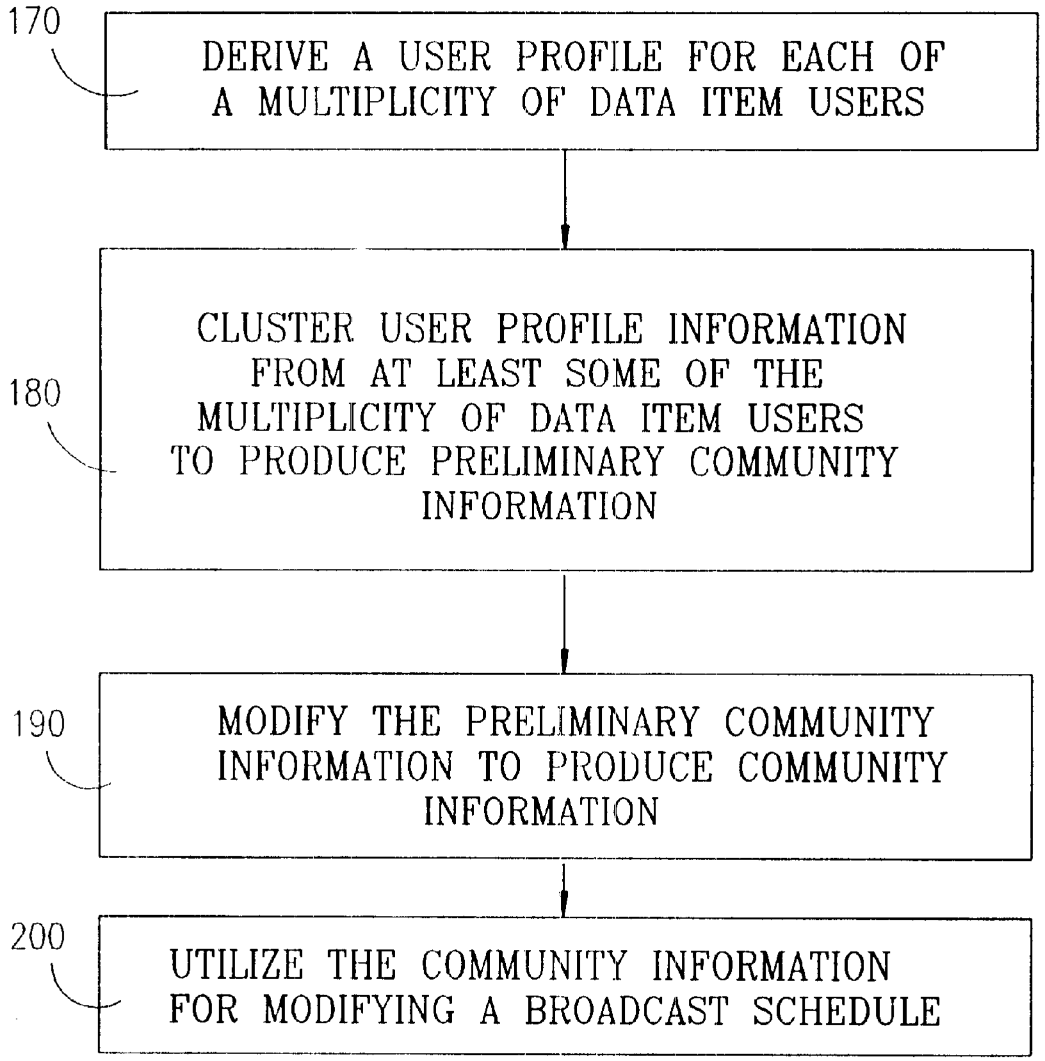
FIG. 2 is a simplified flowchart illustration of a preferred method of operation of the system of FIG. 1.

Reference is now made to FIG. 2, which is a simplified flowchart illustration of a preferred method of operation of the system of FIG. 1. The method of FIG. 2 preferably comprises the following steps:

A user profile is derived for each user of a multiplicity of data item users (step 170). It is appreciated that a wide variety of different methods, including methods known in the art, may be used to derive a user profile, and that a user profile may have any one of a wide variety of structures, including structures which are well known in the art. It is further appreciated that not every user need have exactly the same user profile structure as every other user.

Figure 3:
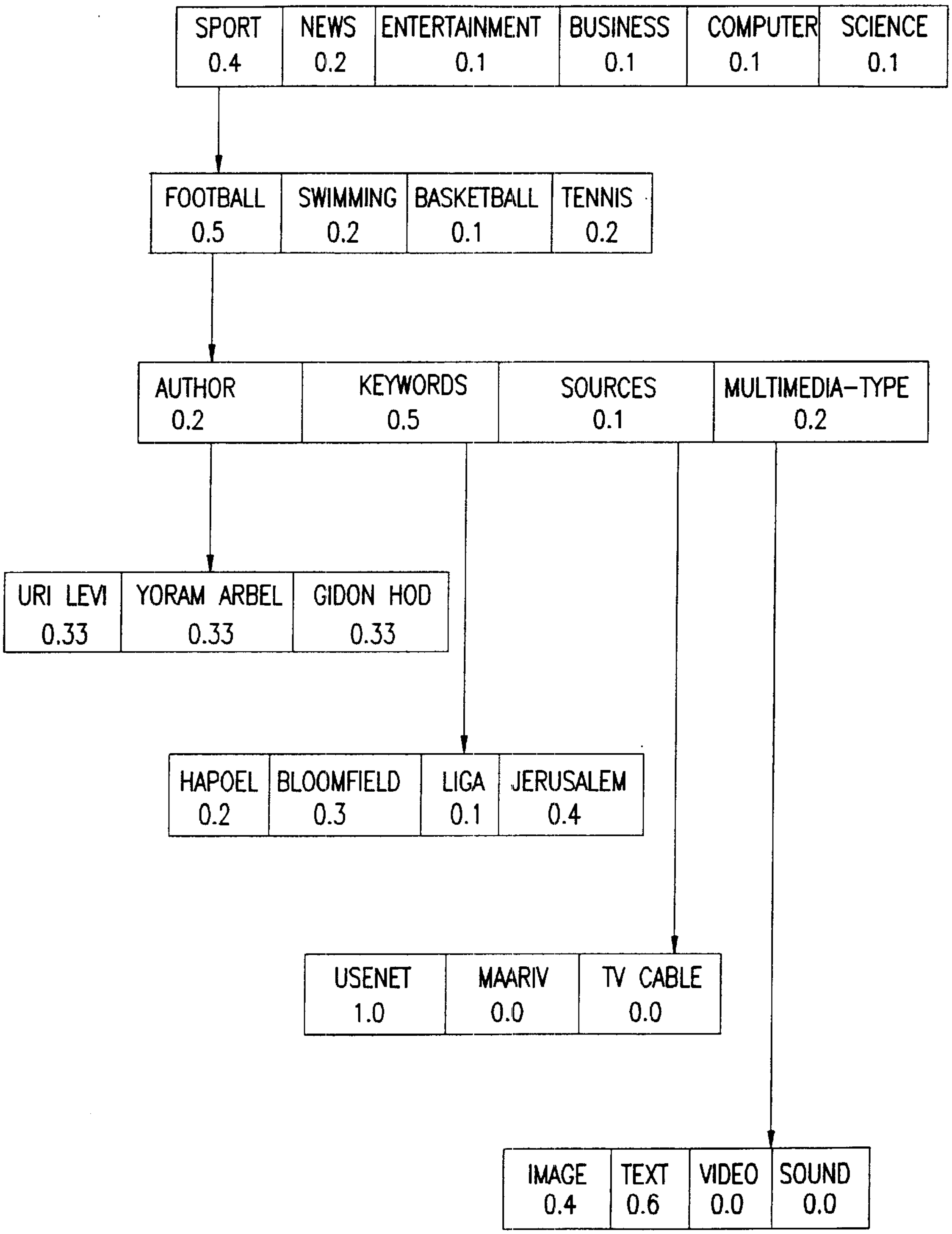
FIG. 3 is a simplified pictorial illustration of a preferred embodiment of a user profile, useful in understanding the method of FIG. 2.
Figure 4:
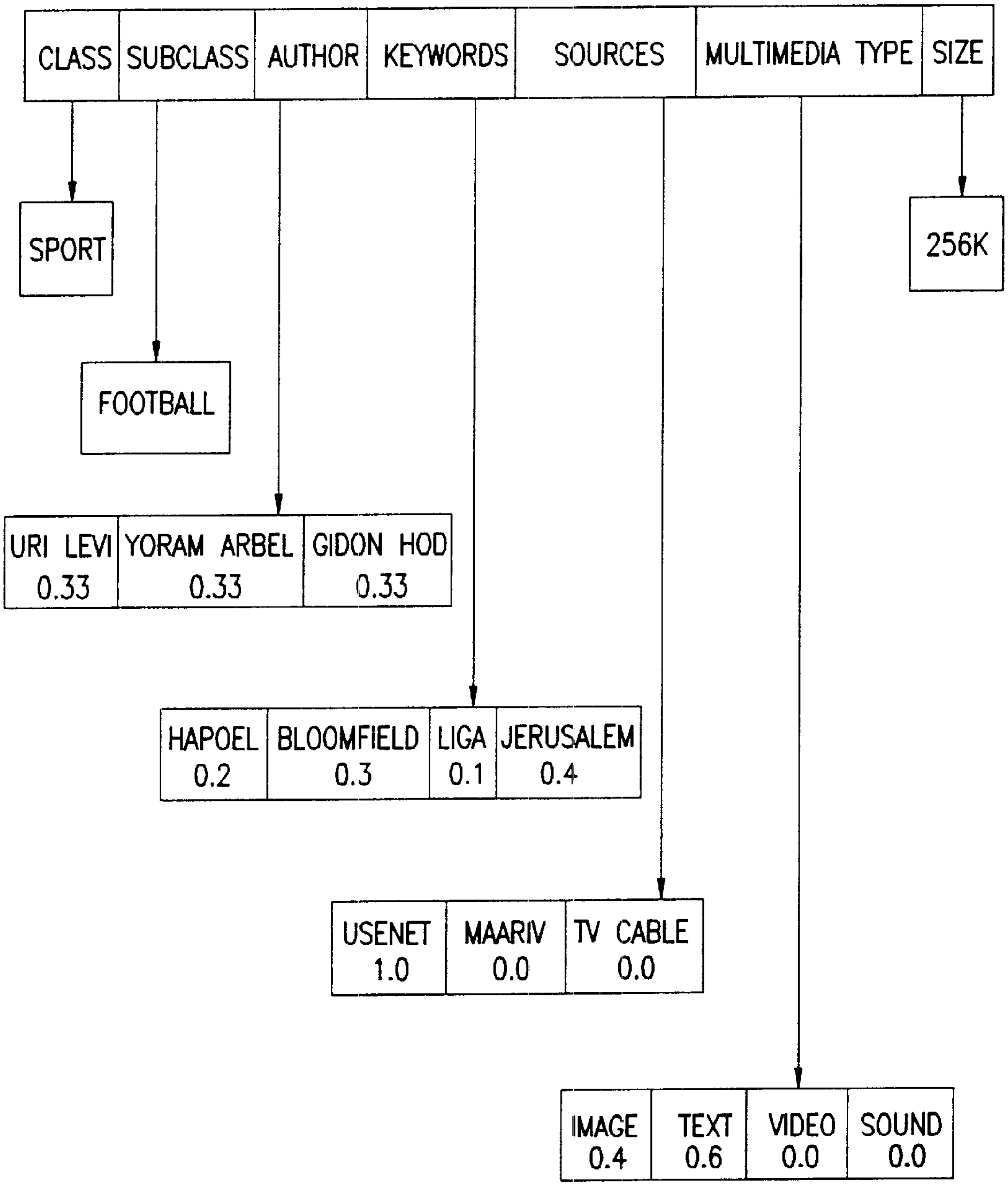
FIG. 4 is a simplified pictorial representation of a multimedia document representation, useful in understanding the method of FIG. 2.

Reference is now additionally made to FIG. 3, which is a simplified pictorial illustration of a preferred embodiment of a user profile, useful in understanding the method of FIG. 2. In the example user profile of FIG. 3, a profile is depicted as a tree, in which each level represents a different level of information about user preferences, each node in the tree being represented as a vector, the sum of whose component values is 1.0. Reference is now additionally made to FIG. 4, which is a simplified pictorial representation of a multimedia document representation, useful in understanding the method of FIG. 2. It is appreciated that the example document representation of FIG. 4 is generally compatible with the example user profile of FIG. 3.

Referring back to FIG. 2, user profile information from at least some of the multiplicity of data item users is clustered together to produce preliminary community information (step 180). The clustering in step 180 may use any appropriate clustering method for combining together similar profiles. Preferably, an appropriate clustering method may be chosen from the field of information retrieval technology, with the additional feature that more than one level of user profile, such as more than one level of the example user profile of FIG. 3, is used for clustering.

Clustering of user profiles preferably is based on similarity between user profiles. Similarity between two user profiles, based on user classes and subclasses, may preferably be computed in accordance with the following formula:

$$\text{similarity}(\text{user1}, \text{user2}) = \frac{\sum_{C}\sum_{Si} \text{user1\_classi} \cdot \text{user1\_subclassij} \times \text{user2\_classi} \cdot \text{user2\_subclassij}}{\sqrt{\sum_{C}\sum_{Si} (\text{user1\_classi} \cdot \text{user1\_subclassij})^2 \cdot \sum_{C}\sum_{Si} (\text{user2\_classi} \cdot \text{user2\_subclassij})^2}}$$

where user1 and user2 are class vectors of two user profiles, each user profile having a plurality of subclasses, C being the number of classes and Si the corresponding number of subclasses. It is appreciated that the above formula comprises one example of a suitable formula, and that other formulas may be used.

Preferably, clustering is carried out using an appropriate agglomerative clustering method, as is well known in the art. One example of an appropriate method for clustering is as follows:

0. Identify each user profile as a point in the space to be merged.
1. Initialize each point as a cluster.
2. Find the two closest clusters in the space and merge them together.
3. Compute the distance from the newly formed cluster to all other clusters.
4. If more than one cluster remains, return to step 2.

Typically, a method such as that described above outputs a complete binary tree wherein each internal node of the tree represents a merge between two cluster and the leaves are the points in the space, or user profiles. Typically, the lower levels in the tree are small tight clusters while the higher levels are larger, general clusters. The indicated method, which operates on the available data and is not limited by external parameters, is considered, based on the work of the inventors of the present invention, to be preferred in the present invention.

In the method described above, a measure of closeness or distance is important in determining which clusters to merge. A number of ways of determining distance are well known in the art. In the present invention, it is believed to be preferred to use a "complete link" method, in which the distance between two clusters is the distance between their two furthest points. This method is believed likely to produce bound clusters, as opposed to long, "straggly" clusters.

An approach to expressing the method described above is to use the Lance Williams dissimilarity update formula, which is well-known in the art. The formula enables incremental recalculation of cluster distances. The Lance-Williams dissimilarity update formula is given as follows:

$$d(ci,j,ck) = \alpha i \cdot d(ci,ck) + \alpha j \cdot d(cj,ck) + \beta \cdot d(ci,cj) + \gamma |d(ci,ck) - d(cj,ck)|$$

where, for the preferred case of complete link, the following parameters are preferably used:

$$\alpha i = 1/2$$

$$\beta = 0$$

$$\gamma = 1/2$$

The preliminary community information is modified to produce community information (step 190). Referring back to FIG. 1, it is appreciated that each clustering agent 140 is operative to produce preliminary community information relating to a plurality of associated user stations 100, which plurality of associated user stations 100 is generally disjoint from each other plurality of user stations 100 associated with another clustering agent 140. For reasons of efficiency, it is desirable nonetheless for the preliminary community information produced by each clustering agent 140 to be modified and made uniform with community information produced by other clustering agents 140. Preferably, the union set agent 150 is primarily operative to carry out step 190, with final agglomeration at the community level being carried out by the community agent 155, as described above.

Referring back to FIG. 2, in step 190, preferably preliminary community information, preferably in the form of preliminary community profiles produced by a plurality of clustering agents, is unified preferably using methods similar to those described above for user profiles in step 180. Preferably, as described above with reference to FIG. 1, the union set agent sends information back to the clustering agents, the information comprising updated community profile information which replaces the preliminary community profile information. In this way, as described above with reference to FIG. 1, different clustering agents will produce information agglomerated into the same community profiles. In this way, since each community agent is associated with one community profile, the union set agents preferably determine the number of community profiles and the number of community agents.

The community information is then utilized for modifying a broadcast schedule (step 200). Typically, the broadcasting center has a list of items to broadcast, the list being made available to a broadcasting agent. It is appreciated that each item, sometimes referred to herein as a "document", may comprise any article or item typically broadcast by a broadcaster, such as, for example, a document, an image, a video, a computer program, a television program, an update to any of the previously listed items, or any other appropriate article or item. The agent attempts to prepare, based on document information and on community profiles, a broadcasting program which will maximize the satisfaction of the user community. Preferably, this task comprises extracting a multimedia document representation based on information that accompanies the multimedia document; and scoring all documents and preparing a broadcast program for each community based on the results of the scoring.

The broadcasting agent preferably determines the similarity between the community profiles and the document collection. Different communities rate the documents differently. Therefore, for each document in the document collection, the broadcasting agent prepares a vector of scores with respect to each community profile. In other words, for each document we have a vector of scores where score si is the score that the document received by community i. A preferable function that the broadcasting agent may use for scoring the documents is as follows:

$$\text{Score}_{\text{community\_profile, document}} = \text{Community\_Class\_Weight}_c \times \text{Community\_Subclass\_Weight}_s \times$$

-continued $$\left[\sum_{D} \text{Com\_prof\_desc}_{d} \left\{ \frac{\sum_{k} \text{doc\_term}_i \times \text{prof\_term}_i}{\sqrt{\sum_{k} \text{doc\_term}_i^2 \times \sum_{k} \text{prof\_term}_i^2}} \right\} \right]$$

where:

Community_Class_Weightc is the weight of class c according to the community profile;

Community_Subclass_Weights is the weight of subclass s of class c of the community profile;

Com_prof_descd is the description field's weight of the community profile;

D is the number of description fields in the description vector of the profile; and K is the number of terms in the term vector.

Figure 5:
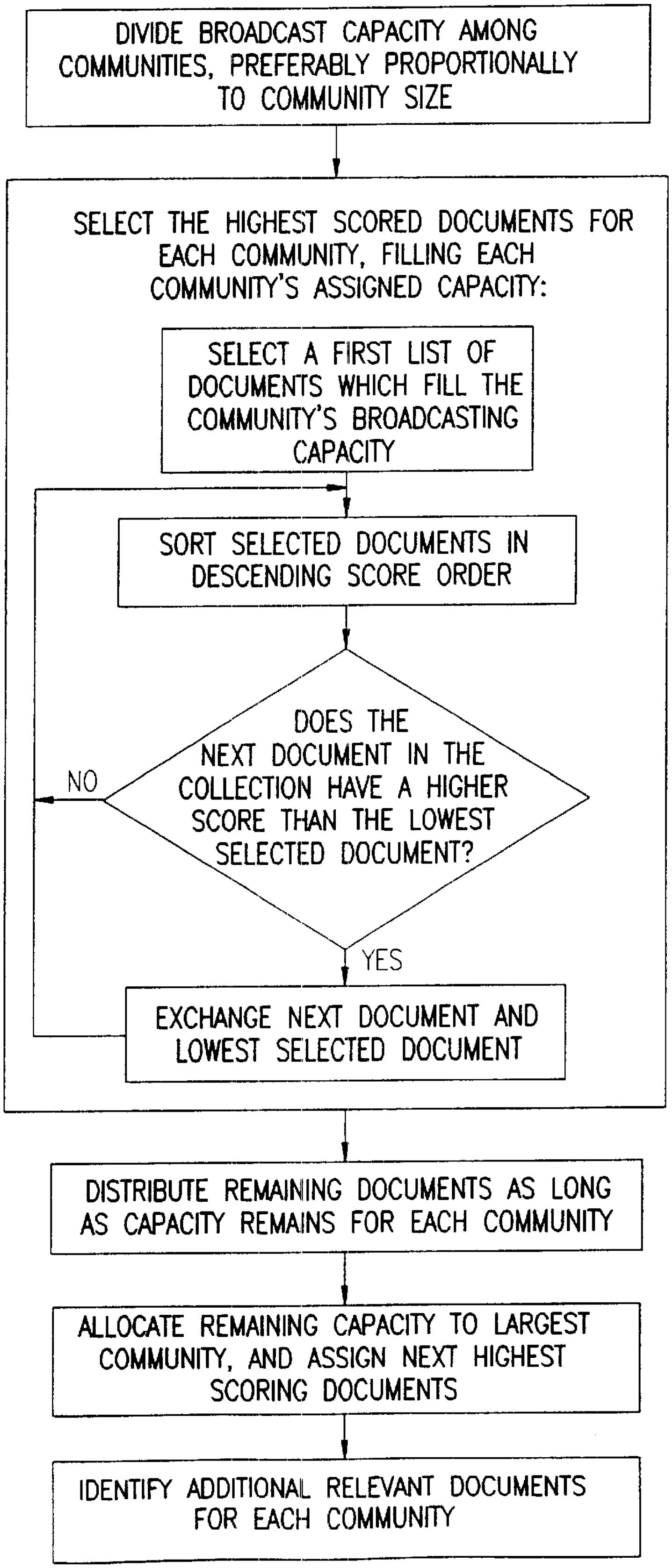
FIG. 5 is a simplified flowchart illustration of a preferred method of operation of a portion of step 200 of FIG. 2.

A broadcast program is then chosen for each community. Reference is now additionally made to FIG. 5, which is a simplified flowchart illustration of a preferred method of operation of a portion of step 200 of FIG. 2. The method of FIG. 5 comprises preferred method for choosing a broadcast program for each community. The method of FIG. 5 is self explanatory, except as described below.

Preferably, after an initial community program is prepared for each community, an attempt is made to extend the programs to be broadcast by scanning the list of documents selected to be broadcast for all users and assigning, to each community, additional relevant documents that were selected to be broadcast but were not assigned to that community program. In this context, a relevant document for a community is preferably defined as a document whose score for that community exceeds a relevancy threshold, the relevancy threshold typically comprising a parameter predefined by an operator of the system.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A system for collecting user feedback in a data broadcasting system, the system for collecting user feedback comprising:

a multiplicity of user profile agents, each user profile agent being associated with one of a multiplicity of users of the data broadcasting system and being operative to create a tree-structured user profile based on activity of the one user;

a user profile subsystem associated with a plurality of user profile agents chosen from among the multiplicity of user profile agents and operative to derive an integrated user profile based on the plurality of user profiles created by the plurality of user profile agents; and a broadcasting agent operatively associated with a broadcast center of the data broadcasting system and in operative communication with the user profile subsystem and receiving therefrom said integrated user profile, wherein the user profile subsystem comprises a plurality of clustering agents, each clustering agent being operatively associated with a subset of user profile agents chosen from among the plurality of user profile agents and being operative to derive a preliminary community profile based on the plurality of user profiles created by the subset of user profile agents.

2. A system according to claim 1 and also comprising at least one union set agent in operative communication with at least two of said plurality of clustering agents and operative to coordinate the operation of said at least two clustering agents.

3. A system according to claim 2 and wherein said union set agent is operative to coordinate the operation of said at least two clustering agents by coordinating at least one characteristic of the preliminary community profile derived by said clustering agents.

4. A system according to claim 3 and also comprising a community profile agent operative to derive a community profile from the preliminary community profile.

5. A system according to claim 1 and wherein said integrated user profile comprises at least one community profile.

6. A system according to claim 1 and wherein the subset of user profile agents associated with any one of the plurality of clustering agents is disjoint from the subset of user profile agents associated with any other one of the plurality of clustering agents.

7. A system according to claim 6 and also comprising at least one union set agent in operative communication with at least two of said plurality of clustering agents and operative to coordinate the operation of said at least two clustering agents.

8. A system according to claim 7 and wherein said union set agent is operative to coordinate the operation of said at least two clustering agents by coordinating at least one characteristic of the preliminary community profile derived by said clustering agents.

9. A system according to claim 8 and also comprising a community profile agent operative to derive a community profile from the preliminary community profile.

10. A system according to claim 1 and wherein each clustering agent is operative to derive the preliminary community profile based, at least in part, on a complete link clustering method.

11. A method for collecting user feedback in a data broadcasting system, the method comprising:

providing a multiplicity of user profile agents, each user profile agent being associated with one of a multiplicity of users of the data broadcasting system;

creating, using a plurality of user profile agents from among the multiplicity of user profile agents, a plurality of tree-structured user profiles based on activity of a plurality of users;

deriving, using a user profile subsystem associated with a plurality of user profile agents chosen from among the multiplicity of user profile agents, an integrated user profile based on the plurality of user profiles created by the plurality of user profile agents; and utilizing a broadcasting agent operatively associated with a broadcast center of the data broadcasting system and in operative communication with the user profile subsystem and receiving therefrom said integrated user profile, wherein the user profile subsystem comprises a plurality of clustering agents, each clustering agent being operatively associated with a subset of user profile agents chosen from among the plurality of user profile agents, and the deriving step comprises deriving the integrated user profile based on the plurality of user profiles created by the subset of user profile agents.

12. A method according to claim 11 and wherein the deriving step also comprises coordinating the operation of at least two of said plurality of clustering agents using at least one union set agent in operative communication with at least two of said plurality of clustering agents.

13. A method according to claim 12 and also comprising said union set agent coordinating the operation of said at least two clustering agents by coordinating at least one characteristic of a preliminary community profile derived by said clustering agents.

14. A method according to claim 11 and wherein said integrated user profile comprises at least one community profile.

15. A method according to claim 14 and wherein the deriving step includes a community profile agent deriving said at least one community profile from a preliminary community profile.

16. A method according to claim 11 and wherein the utilizing step comprises modifying at least one broadcast program based, at least in part, on the integrated user profile.

17. A method according to claim 16 and wherein said modifying comprises assigning, to a program associated with a first community, items scheduled to be broadcast according to a program associated with a second community.

18. A method according to claim 17 and wherein said assigning comprises assigning based on a measure of relevancy to the first community.

19. A method according to claim 11 and wherein the subset of user profile agents associated with any one of the plurality of clustering agents is disjoint from the subset of user profile agents associated with any other one of the plurality of clustering agents.

20. A method according to claim 19 and wherein the deriving step also comprises coordinating the operation of at least two of said plurality of clustering agents using at least one union set agent in operative communication with at least two of said plurality of clustering agents.

21. A method according to claim 20 and wherein said union set agent is operative to coordinate the operation of said at least two clustering agents by coordinating at least one characteristic of the preliminary community profile derived by said clustering agents.

22. A method according to claim 21 and wherein the deriving step includes a community profile agent deriving a community profile from the preliminary community profile.

23. A system according to claim 11 and wherein each clustering agent is operative to derive a preliminary community profile based, at least in part, on a complete link clustering method.

24. A system for collecting user feedback in a data broadcasting system, the system for collecting user feedback comprising:

a multiplicity of user profile agent means for creating a user profile, each user profile agent means being associated with one of a multiplicity of users of the data broadcasting system and being operative to create a tree-structured user profile based on activity of the one user;

means for deriving an integrated user profile, associated with a plurality of user profile agent means chosen from among the multiplicity of user profile agent means and operative to derive an integrated user profile based on the plurality of user profiles created by the plurality of user profile agent means; and broadcasting agent means for receiving the integrated user profile, operatively associated with a broadcast center of the data broadcasting system and in operative communication with the means for deriving an integrated user profile and receiving therefrom said integrated user profile, wherein the means for deriving an integrated user profile comprises a plurality of clustering agent means, each clustering agent means being operatively associated with a subset of user profile agent means chosen from among the plurality of user profile agent means and being operative to derive a preliminary community profile based on the plurality of user profiles created by the subset of user profile agent means.

* * * * *